N. O. PERRY.
ANIMAL TRAP.
APPLICATION FILED DEC. 27, 1915.
1,202,309.
Patented Oct. 24, 1916.
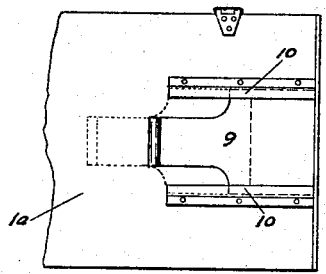
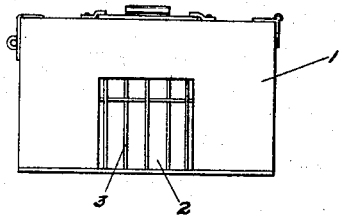
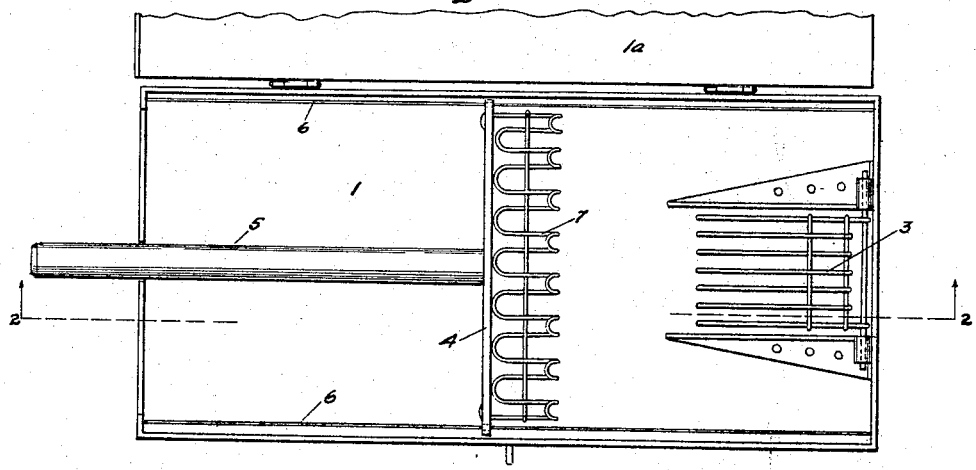
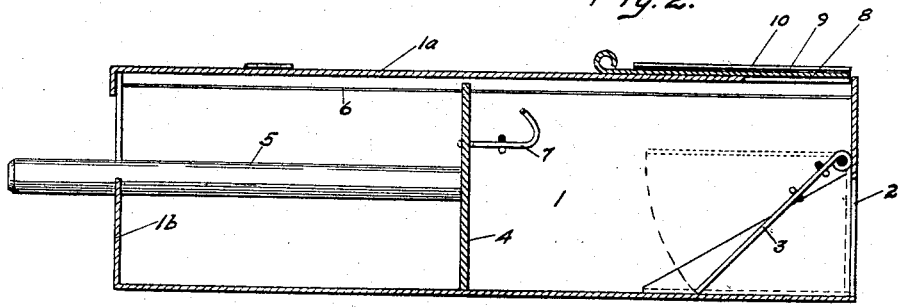
Witnesses:
NEWLAND O. PERRY,
Inventor,
By William H. Fowler
Atty.

UNITED STATES PATENT OFFICE.

NEWLAND O. PERRY, OF SEATTLE, WASHINGTON.

ANIMAL-TRAP.

1,202,309.

Specification of Letters Patent.   Patented Oct. 24, 1916.

Application filed December 27, 1915. Serial No. 68,821.

*To all whom it may concern:*

Be it known that I, NEWLAND O. PERRY, a citizen of the United States, residing at the city of Seattle, county of King, State of Washington, have invented a new and useful Animal-Trap, of which the following is a specification.

My invention relates to improvements in animal traps which, in addition to the ordinary trap, has in the back thereof, a false or sliding back just inside of the permanent back, which said false or sliding back is operated on four wires, two of which, one on each side, are attached to the upper front end of the trap and proceed backward along the sides of the trap and through a hole in the top of the false or sliding back and are attached to the permanent back of the trap; the other two wires, one on each side, are attached to the bottom front end of the trap and proceed backward along the sides of the trap and through a hole in the bottom of the false and sliding back and are attached to the permanent back of the trap thus allowing the said false or sliding back to be moved to the front or back ends of the trap at pleasure by the use of a handle attached to the center of the false or sliding back and extending through the permanent back in connection therewith and directly over the entrance gate and in the center of the front end of the trap is a hole with a sliding cover so that the hole may be opened or closed by sliding the said door front or back at pleasure. By the use of these appliances any animal entrapped may be pushed or crowded to the front end of the trap and removed therefrom through the hole in the top.

I obtained these objects by mechanism illustrated in the following drawings in which:

Figure 1 is a vertical section of the entire trap with the cover raised. Fig. 2 is a plan view of the inside of the trap showing the false or sliding back and the wires on which the same plays. Fig. 3 is the mouth of the trap showing the wire gate through which the animal must enter. Fig. 4 is the partial plan view of the top and front end of the trap showing the hole with the sliding cover.

1 is the casing composing the body of the trap. 1ª is a cover therefor.

2 is the entrance of the trap.

3 is the wire frame hung on hinges that allow the animal to enter by pushing it up and which will fall after the entrance of the animal.

4 is the false or sliding back.

5 is the handle which is attached to the middle of the false or sliding back and extends through a hole in the back end of the trap by means of which the false or sliding back is moved toward the front or back ends at pleasure.

6 are the wires which are attached to the front and back ends of the trap on the top and on the bottom on the inside and parallel to the sides of the trap and pass through the top and bottom of the false or sliding back and on which the said false or sliding back plays back and forth.

7 is a wire on which is placed the bait.

1ᵇ is the back end of the trap through which the handle attached to the false and sliding back passes and to which are attached the wires 6 at the rear end of the trap.

9 is the sliding door in the top of the trap.

10 are cleats on either side under which the sliding door moves front or back.

I claim:

In combination, a casing, an entrance in the front end thereof provided with a wire frame gate, a pair of wires extending longitudinally of the casing, a false back mounted on said wires to slide longitudinally of the casing, an operating handle for said false back extending through the rear wall, bait holding means carried by the false back, an opening in the front part of the top of the casing and a sliding door for controlling said opening.

NEWLAND O. PERRY.

Witnesses:
 SOPHIE BUGGE,
 ERNEST HAINES.

Copies of this patent may be obtained for five cents each, by addressing the "Commissioner of Patents, Washington, D. C."